Nov. 29, 1966  T. G. BROWN ETAL  3,288,004
PIPE FINISHING MACHINE
Filed Oct. 7, 1964  3 Sheets-Sheet 1
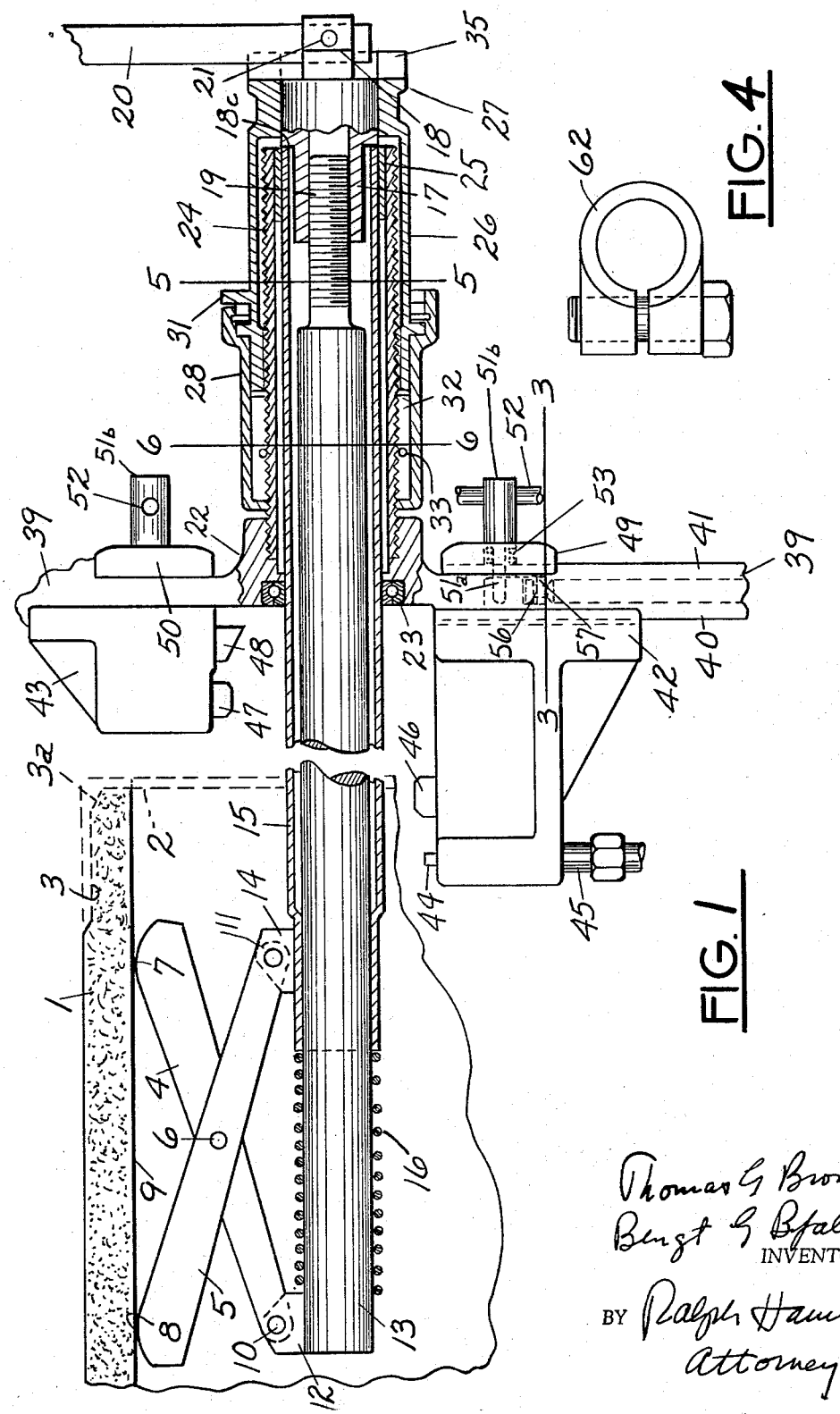
INVENTORS
Thomas G. Brown
Bengt G. Bfalme
BY Ralph Hammar
Attorney

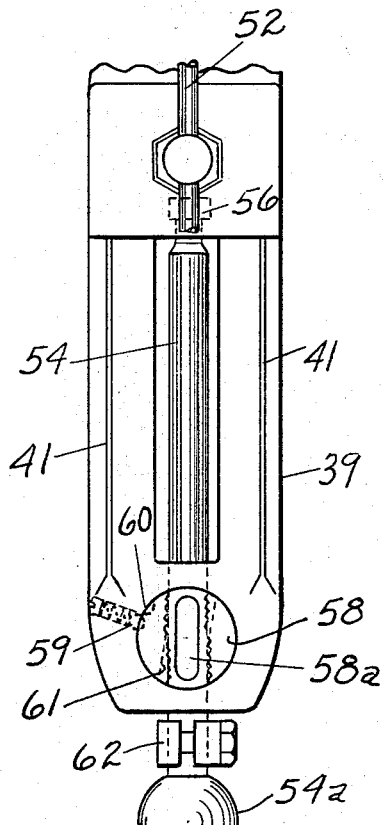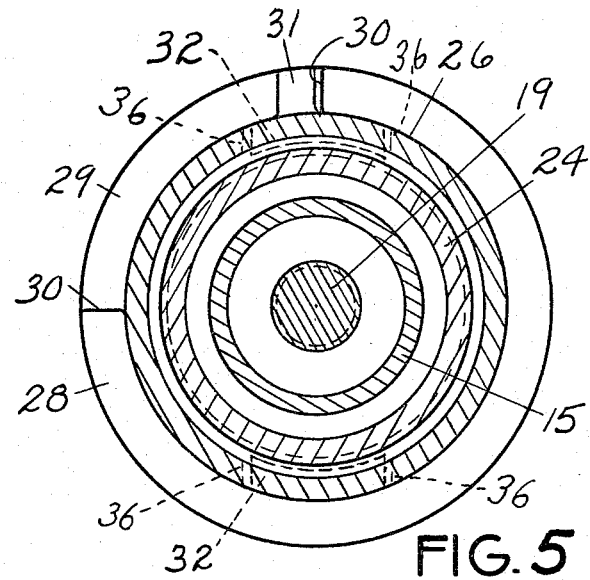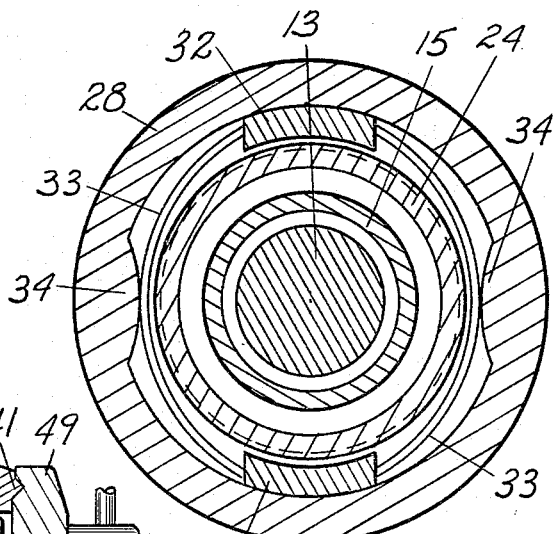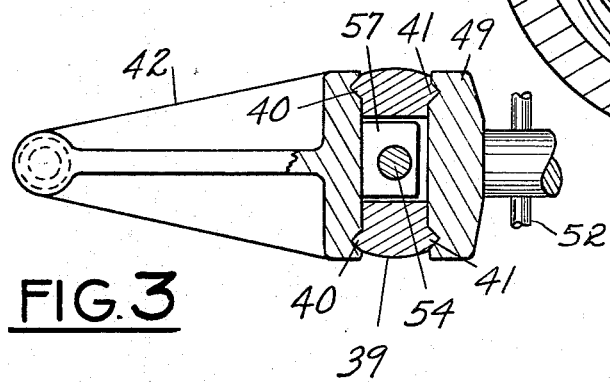

Nov. 29, 1966                T. G. BROWN ETAL                3,288,004
                            PIPE FINISHING MACHINE
Filed Oct. 7, 1964                                        3 Sheets-Sheet 3

Thomas G Brown
Bengt G Bjelme
                INVENTORS
BY Ralph Hammar
   Attorney

United States Patent Office 3,288,004
Patented Nov. 29, 1966

3,288,004
PIPE FINISHING MACHINE
Thomas G. Brown and Bengt G. Bjalme, Erie, Pa., assignors to Reed Manufacturing Company, Erie, Pa., a corporation of Pennsylvania
Filed Oct. 7, 1964, Ser. No. 402,131
4 Claims. (Cl. 82—4)

This invention is intended to improve the rigidity and ease of adjustment of a machine for cutting and finishing the ends of asbestos cement pipe and the like.

Figure 7:
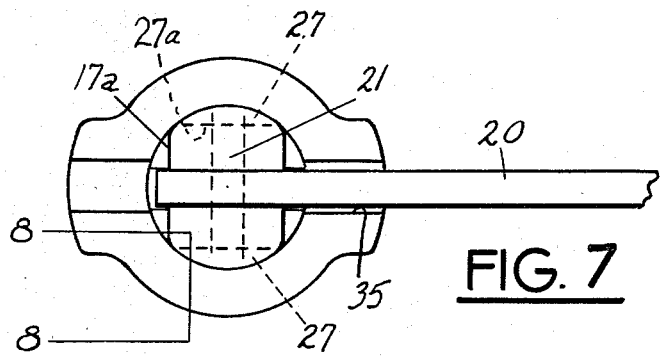
Figure 8:
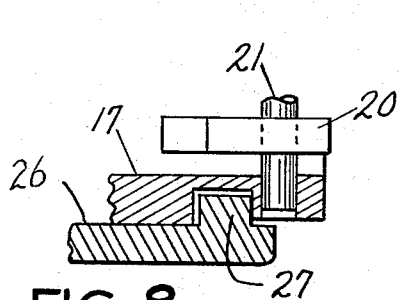
Figure 9:
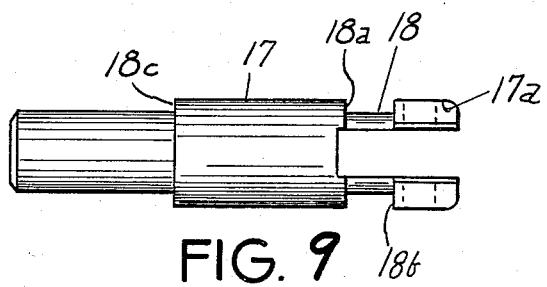
Figure 10:
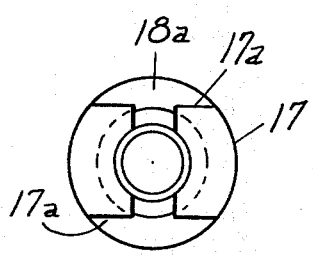

In the drawing, FIG. 1 is a partial longitudinal section of the machine mounted on the end of a pipe, FIG. 2 is a plan view of one of the tool carrying arms, FIG. 3 is a section on line 3—3 of FIG. 1, FIG. 4 is an end view of a stop, FIG. 5 is a section on line 5—5 of FIG. 1, FIG. 6 is a section on line 6—6 of FIG. 1, FIG. 7 is an end view of the turning tool, FIG. 8 is a section on line 8—8 of FIG. 7, FIG. 9 is a side elevation of the nut for actuating the mechanism to grip the pipe, and FIG. 10 is an end view of the nut.

In the drawing, 1 indicates an end of asbestos cement pipe or the like which is to be finished. The pipe is somewhat out of round and the ends may be rough or cracked or gouged or otherwise unsuitable for making liquid-tight joints. The finishing operations require cutting or facing the end as indicated by dotted line 2, turning the outside diameter to fit a coupling sleeve as indicated by dotted line 3 and bevelling the end as indicated by dotted line 3a. To perform these operations, the pipe is gripped by an expanding mandrel having three or more pairs of fingers 4, 5 pivoted to each other at an intermediate point 6 and having outer ends 7, 8 engaging axially spaced points of the inner surface 9 of the pipe and having inner ends, 10, 11 respectively pivoted to a bracket 12 fixed to a rod 13 and to a bracket 14 fixed to a tube 15. The fingers are distributed angularly about the axis of the rod. When the rod 13 is telescoped into the tube 15, the ends 7, 8 of the fingers expand or move radially outward to grip the inner surface 9 of the pipe. A coil spring 16 surrounding the rod 13 and arranged between the end of the tube 15 and the brackets 12 urges the rod outward or in the direction to move the fingers toward the retracted position. When the fingers are expanded or tightened against the inside of the pipe, the tube 15 is rigidly centered on the longitudinal axis of the pipe. By having the brackets 14 fixed to the tube 15 and the brackets 12 fixed to the rod 13, the rod is free to slide in the tube but is prevented by the fingers from rotating relative to the tube.

The fingers are expanded to grip the pipe by a nut 17 telescoped within the tube 15 and having a groove 18 with spaced shoulders 18a, 18b. The nut also has a shoulder 18c thrusting against the outer end of the tube 15. The nut is screwed onto a reduced section 19 of the rod 13. The outer end of the nut is slotted to receive a handle 20 pivoted on a pin 21. In the operating position, the handle 20 extends at right angles to the nut as shown, providing leverage for tightening the nut on the reduced section 19 of the rod 13. It will be noted that the tube 15 has a smooth, unobstructed outer surface and that the outer end of the nut 17 is in substantially direct continuation of that surface. The threads of the nut and of the reduced section 19 are within the tube 15 and accordingly are protected. The design permits long travel of the rod 13 so that the fingers 4, 5 can grip a wide range of pipe sizes. In a commercial form, a single size handles from 4 inch to 14 inch pipe.

The turning and facing tool is mounted on the tube 15 after the fingers 4, 5 have been expanded to grip the pipe. To do this, the handle 20 is turned about pivot 21 into line with the axis of the tube 15 and the turning tool is slid over the outer end of the tube 15. The turning tool has a hub 22 carrying a bearing 23 and fixed in the hub is an externally threaded sleeve 24 coaxial with the bearing and tube and carrying at its outer end a sleeve bearing 25 which rides on the tube 15. The bearings 23 and 25 maintain the turning tool centered on the axis of the tube 15. Telescoped over the outer end of the sleeve 24 is a collar 26 having at its outer end inwardly extending segmental flanges 27 which thrust against shoulders 18a, 18b on the nut 17 in the FIG. 7 position. The inner edges 27a of the flanges 27 are parallel to each other. The outer end of the nut 17 has parallel flats 17a which slide between the edges 27a when the nut is turned 90° from the FIG. 7 position.

At the inner end of the collar 26 is rotatably carried a sleeve 28 having on one end (FIG. 5) a recess 29 providing shoulders 30 cooperating with a projection 31 on the collar to limit the rotation of the sleeve 28 with respect to the collar 26. Within the sleeve 28 are two segmental nuts 32 connected by springs 33 which urge the nuts 32 outward. In the position shown in FIGS. 5 and 6, the nuts 32 are held outward and clear the externally threaded sleeve 24. Upon turning the sleeve 28 90° from the position shown in FIGS. 5 and 6, the nuts 32 are brought into engagement with cam surfaces 34 which cam the nuts inward into engagement with the threads of the sleeve 24 and thereby couple the collar 26 to the sleeve 24.

The collar 26 is keyed to the nut 17 by the handle 20 which engages a slot 35 in the outer end of the collar. As the hub 22 of the turning tool is turned, the nuts 32 cause feeding of the turning tool along the tube 15. The sleeve 24 being fixed to the hub 22 turns with the turning tool and the nuts 32 are confined between shoulders 36 on the collar 26. Since the collar 26 is held stationary by engagement of the handle 20 with the slot 35, turning of the hub 22 causes the sleeve 24 to screw into and out of the nuts 32 and thereby traverse the tube 15 to feed the cutting tool relative to the pipe. In the position shown in FIG. 1, end thrust is taken by engagement of the segmental flanges 27 of the collar 26 with shoulders 18a, 18b on the nut 17.

The pipe cutting tool has arms 39 integral with and projecting from opposite sides of the hub 22. The arms 39 have spaced guideways 40, 41 on opposite sides of the arms as shown more clearly in FIG. 3. Riding on the guideways 40, 41 are tool holders 42, 43. The tool holder 42 carries a cut-off tool 44 mounted in a barrel 45 which may be fed radially (by a mechanism not shown) to perform a cut-off or facing operation. During this cut-off operation, the tool merely rotates on the sleeve 15 and the nuts 32 are disengaged. The tracking of the tool 44 in the groove it cuts inherently holds the tool in position on the pipe. The tool holder 42 also carries a turning tool 46. The tool holder 43 carries a finish turning tool 47 and a bevel tool 48. The tool holders 42 and 43 are suitably ribbed to provide the required rigidity and acquire additional rigidity by being clamped to the spaced guides 40 by clamps 49 and 50 on guideways 41 and respectively cooperating with the tool holders 42 and 43. The clamps 49, 50 are of identical construction and each is tightened by a nut 51a screwed onto a stub 51b fixed in the associated tool holder. When the nut 51a is tightened, for example, by means of a handle 52, the tightening of the clamp solidly locks the clamp and the associated tool holder against the guides 40 and 41 and nearly doubles the rigidity of the arm 39. The reason for this is that the length of the arm 39 between the tool holder 42 or 43 and the associated clamp 49 or 50 is effectively immobilized by the rigid tool holder and clamp so the span of the arm 39 subject to deflection under bending stress is materially reduced.

When the clamping nut 51a is loosened, the spring 53 maintains sufficient clamping pressure so that the associated tool holder 42 or 43, as the case may be, is held in place although it can be slid along the guideways 40 to position the cutting tools at the desired radial distance from the axis of the pipe.

The position of the tool holders 42, 43 is adjusted by an adjusting screw 54 having a handle 54a at its outer end and having its inner end 56 rotatably anchored in a tongue 57 in the associated tool holder. The adjusting screw cooperates with a quick release nut 58 rotatably mounted in the outer end of arm 39 and turned by a handle 58a. A ball detent 59 cooperates with notches 60 in the nut to hold the nut in either engaged or released position. In the engaged position shown in FIG. 2, turning the handle 54a effects a fine adjustment of the tool. When the nut is turned to bring the smooth sections 61 of the nut against the adjusting screw 54, the adjusting screw may be pushed or pulled to rapidly move the tool holder to a new position. Upon reaching the new position, the nut is returned to the position illustrated in FIG. 2 and a fine adjustment is effected by turning the handle 54a.

Since it is usually necessary to make several cuts to finish an end of the pipe, a stop 62 is provided which may be clamped to the adjusting screw 54 to determine the position for the final or finish cut. The stop is useful when several pipes of the same size are to be finished.

What is claimed as new is:

1. A pipe finishing machine having a tube, a rod slidable in the tube, one end of the rod projecting out one end of the tube, pairs of links pivoted to each other, said pairs being disposed about the axis of the tube, one link of each pair being pivoted to said one end of the tube and the other link of each pair being pivoted to said one end of the rod whereby the pairs of links expand radially so as to grip the bore of a pipe as said one end of the rod approaches said one end of the tube, said rod having a threaded spindle within the opposite end of the tube, a nut within said opposite end of the tube screwed onto said spindle, said nut having a shoulder thrusting against said opposite end of the tube and having a portion projecting outside said opposite end of the tube and accessible to means for turning the nut, a handle pivoted on said projecting portion and movable to a position crosswise to the axis of the tube, a hub slidably and rotatably journaled on the tube, an externally threaded sleeve fixed to the hub and extending from the hub in telescoping relation to said opposite end of the tube, a collar surrounding said sleeve and having a shoulder thrusting against said nut, said collar having a slot receiving the handle in its crosswise position, retractable nuts in the collar movable into and out of engagement with said sleeve, an arm extending from the hub having two pairs of parallel surfaced radially extending guideways respectively on one and on the opposite side of said arm, a tool holder on one pair of guideways, a clamp on the other pair of guideways, and clamping means for tightening the tool holder and clamp against the guideways.

2. A pipe finishing machine having a tube, a rod slidable in the tube, one end of the rod projecting out one end of the tube, pairs of links pivoted to each other, said pairs being disposed about the axis of the tube, one link of each pair being pivoted to said one end of the tube and the other link of each pair being pivoted to said one end of the rod whereby the pairs of links expand radially so as to grip the bore of a pipe as said one end of the rod approaches said one end of the tube, said rod having a threaded spindle within the opposite end of the tube, a nut within said opposite end of the tube screwed onto said spindle, said nut having a shoulder thrusting against said opposite end of the tube and having a portion projecting outside said opposite end of the tube and accessible to means for turning the nut, a handle pivoted on said projecting portion and movable to a position crosswise to the axis of the tube, a hub slidably and rotatably journaled on the tube, an externally threaded sleeve fixed to the hub and extending from the hub in telescoping relation to said opposite end of the tube, a collar surrounding said sleeve and having a shoulder thrusting against said nut, said collar having a slot receiving the handle when in said crosswise position, retractable nuts in the collar movable into and out of engagement with said sleeve, and holders for pipe cutting tools carried by the hub.

3. A pipe finishing machine having a tube, means at one end of the tube expansible radially so as to grip the bore of a pipe, a hub slidably and rotatably journaled on the tube, an externally threaded sleeve fixed to the hub and extending from the hub in telescoping relation to the opposite end of the tube, a collar surrounding said sleeve, thrust means between the collar and the opposite end of the tube, retractable nuts in the collar movable into and out of engagement with said sleeve, and holders for pipe cutting tools carried by the hub.

4. A pipe finishing machine having a tube, means at one end of the tube expansible radially so as to grip the bore of a pipe, a hub slidably and rotatably journaled on the tube, an externally threaded sleeve fixed to the hub and extending from the hub in telescoping relation to the opposite end of the tube, a collar surrounding said sleeve, thrust means between the collar and the opposite end of the tube, retractable nuts in the collar movable into and out of engagement with said sleeve, an arm extending from the hub having two pairs of parallel surfaced radially extending guideways respectively on one and on the opposite side of said arm, a tool holder on one pair of guideways, a clamp on the other pair of guideways, and clamping means for tightening the tool holder and clamp against the guideways.

No references cited.

WILLIAM W. DYER, JR., *Primary Examiner.*

L. VLACHOS, *Assistant Examiner.*